(12) United States Patent
Reznic et al.

(10) Patent No.: US 8,365,238 B2
(45) Date of Patent: Jan. 29, 2013

(54) METHOD AND APPARATUS FOR USING THE VIDEO BLANKING PERIOD FOR THE MAINTENANCE OF A MODEM THAT IS USED FOR WIRELESS TRANSMISSION OF VIDEO

(75) Inventors: Zvi Reznic, Tel Aviv (IL); Nathan Elnathan, Raanana (IL); Meir Feder, Herzliya (IL); Shay Freundlich, Givat Ada (IL)

(73) Assignee: Amimon Ltd, Herzlia (IL)

( * ) Notice: Subject to any disclaimer, the term of this patent is extended or adjusted under 35 U.S.C. 154(b) by 1460 days.

(21) Appl. No.: 11/619,810

(22) Filed: Jan. 4, 2007

(65) Prior Publication Data
US 2007/0171304 A1 Jul. 26, 2007

Related U.S. Application Data
(60) Provisional application No. 60/756,792, filed on Jan. 6, 2006.

(51) Int. Cl.
*H04N 7/16* (2011.01)
*H04N 7/10* (2006.01)
*H04N 7/12* (2006.01)

(52) U.S. Cl. .......... 725/136; 725/54; 348/435.1
(58) Field of Classification Search .......... 725/54, 725/136; 348/435.1
See application file for complete search history.

(56) References Cited

U.S. PATENT DOCUMENTS
| | | | |
|---|---|---|---|
| 4,554,579 A * | 11/1985 | Citta | 725/131 |
| 5,371,548 A | 12/1994 | Williams | |
| 5,793,411 A * | 8/1998 | Hiraizumi | 725/91 |
| 6,922,549 B2 | 7/2005 | Lyons et al. | |
| 2002/0019987 A1 * | 2/2002 | James et al. | 725/136 |
| 2003/0028339 A1 * | 2/2003 | Caso et al. | 702/90 |
| 2004/0098748 A1 * | 5/2004 | Bo et al. | 725/105 |
| 2005/0216947 A1 * | 9/2005 | Corbin | 725/116 |
| 2006/0048208 A1 * | 3/2006 | Sibley et al. | 725/153 |
| 2006/0209745 A1 | 9/2006 | MacMullan et al. | |
| 2006/0209890 A1 | 9/2006 | MacMullan et al. | |
| 2006/0209892 A1 | 9/2006 | MacMullan et al. | |
| 2006/0212911 A1 * | 9/2006 | MacMullan et al. | 725/81 |
| 2007/0098063 A1 | 5/2007 | Reznic et al. | |
| 2008/0055485 A1 | 3/2008 | Elnathan et al. | |

FOREIGN PATENT DOCUMENTS
| | | |
|---|---|---|
| CN | 1666500 | 9/2005 |
| WO | 2005029737 | 3/2005 |
| WO | 2006101801 | 9/2006 |
| WO | 2006118964 | 11/2006 |

OTHER PUBLICATIONS
"Video Basics", Application Note: 734, Dallas Semiconductor, Apr. 17, 2001.
International Search Report of PCT/US07/00392 dated Sep. 26, 2007.

* cited by examiner

*Primary Examiner* — Nasser Goodarzi
*Assistant Examiner* — Hyun Hong
(74) *Attorney, Agent, or Firm* — Eitan Mehulal & Sadot

(57) ABSTRACT

The vertical blanking period is an idle period in video transmission that was originally intended for allowing the trace back of an electron beam to its point of origin. When sending the video signal over a wireless channel, the wireless channel may remain free of transmission of data during this period. However, in wireless transmission of a video signal in general, and in the transmission of an essentially uncompressed video signal in particular, there is a need to use all the bandwidth available, especially when transmitting a high-definition video signal. Therefore, a method is taught for using the vertical blanking period of a video signal for modem maintenance.

49 Claims, 3 Drawing Sheets

METHOD AND APPARATUS FOR USING THE VIDEO BLANKING PERIOD FOR THE MAINTENANCE OF A MODEM THAT IS USED FOR WIRELESS TRANSMISSION OF VIDEO

CROSS REFERENCE TO RELATED APPLICATIONS

This application claims priority from U.S. provisional patent application Ser. No. 60/756,792 filed on Jan. 6, 2006, and which is incorporated herein in its entirety by this reference thereto.

BACKGROUND OF THE INVENTION

1. Field of the Invention

The invention relates to the usage of the vertical blanking period of a video signal. More specifically, the invention relates to the use of the vertical blanking period of a video signal when transmitted over a wireless channel.

2. Discussion of the Prior Art

In many homes, television and/or video signals are received through cable or satellite links at a set-top box which is located at a fixed point in the house. In many cases, it is desired to place a screen at a point that is a distance from the set-top box by a few meters. This trend is becoming more common as flat-screen televisions having a plasma or liquid crystal display (LCD) are hung on a wall. Connection of the screen to the set-top box through cables is generally undesired for aesthetic reasons and/or installation convenience. Thus, wireless transmission of the video signals from the set-top box to the screen is preferred. Similarly, it may be desired to place a computer, game controller, VCR, DVD, or other video source that generates images to be displayed on a screen a distance from the screen.

Wireless short range transmission in the home is possible over the unlicensed bands around 2.4 GHz or around 5 GHz e.g. in the U.S 5.15-5.85 GHz band. These bands are currently used by wireless local area networks (WLAN), where the 802.11 WiFi standard allows maximal data rates of 11 Mbps (802.11b) or 54 Mbps (for 20 MHz bandwidth using the 802.11g/802.11a standards). Using the emerging Multi-Input Multi-Output technology, the data rate of the emerging 802.11n standard is increased to around 200 Mbps. Another alternative is to use Ultra Wide Band (UWB), which claims to provide a data rate of 100-400 Mbps.

Techniques for transmitting an essentially uncompressed video signal are disclosed in a PCT patent application IL/2004/000779 entitled Wireless Transmission of High Quality Video (hereinafter the '779 application') and in U.S. patent application Ser. No. 11/551,641 entitled Apparatus and Method for Uncompressed, Wireless Transmission of Video (hereinafter the '641 application'), both assigned to common assignee and both of which are incorporated here in by this reference thereto.

In a video signal there are well known time periods referred as the vertical and horizontal blanking periods. These blanking periods were originally designed for that period in time during which an electron beam of a cathode ray tube (CRT) was allowed to move back to an initial position and restart its tracing across the screen. The duration of the horizontal blanking period is shorter than the vertical blanking period. As determined by all video transmission standards, during these periods no video data is transmitted and therefore no use is made of the wireless channel. This also applies to digital video format standards, such as HDMI, DVI, SMPTE 274M, SMPTE 296M, and the like.

Specifically, a typical video sequence is fragmented to video frames, as shown in FIG. 1. Each video frame, for example video frame 110, that normally lasts 16.6 milliseconds, is divided into a video data period, for example period 112, of approximately 96% of the entire time period, and vertical blanking period, for example period 114, of approximately 4% of the entire time period. As previously noted, this period was originally conceived for the mechanical movement of the beam in a CRT from the end of the video portion of the frame, for example frame 110, back to the beginning of the immediately subsequent frame, for example video frame 120.

In order to utilize the transmitting bandwidth, solutions suggest the use of the vertical blanking period for a plurality of purposes. For example, this period may be used for the purposes of video transmission. This use, however, requires large buffering for the purpose of spreading the transmission over 100% of the frame time. The buffering is required at both the transmitter and receiver further increasing the expense in providing such solution.

It would be advantageous for wireless video systems, for example those disclosed in the '779 application and the '641 application, to make use of the period where no video data is to be transmitted, for purposes unique to issues related with such wireless transmission. For example, the invention has recognized that it is possible to overcome prior art limitations when handling wireless modems during the transmission of valid data to reduce the effective channel bandwidth.

SUMMARY OF THE INVENTION

The vertical blanking period is an idle period in video transmission that was originally intended for allowing the trace back of an electron beam to its point of origin. When sending the video signal over a wireless channel, the wireless channel may remain free of transmission of data during this period. However, in wireless transmission of a video signal in general, and in the transmission of an essentially uncompressed video signal in particular, there is a need to use all the bandwidth available, especially when transmitting a high-definition video signal. Therefore, a method and apparatus is taught for using the vertical blanking period of a video signal for modem maintenance.

DETAILED DESCRIPTION OF THE INVENTION

The vertical blanking period is an idle period in video transmission that was originally intended to allow the trace back of an electron beam to its point of origin. When sending the video signal over a wireless channel, the wireless channel may remain free of transmission of data during this period. However, in a wireless transmission of a video signal in general, and in the transmission of an essentially uncompressed video signal in particular, there is a need to use all the bandwidth available, especially when transmitting a high-definition video signal. Therefore, a method and apparatus for using the vertical blanking period for the purpose of modem maintenance is discussed. An exemplary but non-limiting modem is shown with respect to the '641 application. In accordance with the invention both the transmitter and the receiver are aware of the types of modem maintenance activities performed during the vertical blanking period.

Figure 1:
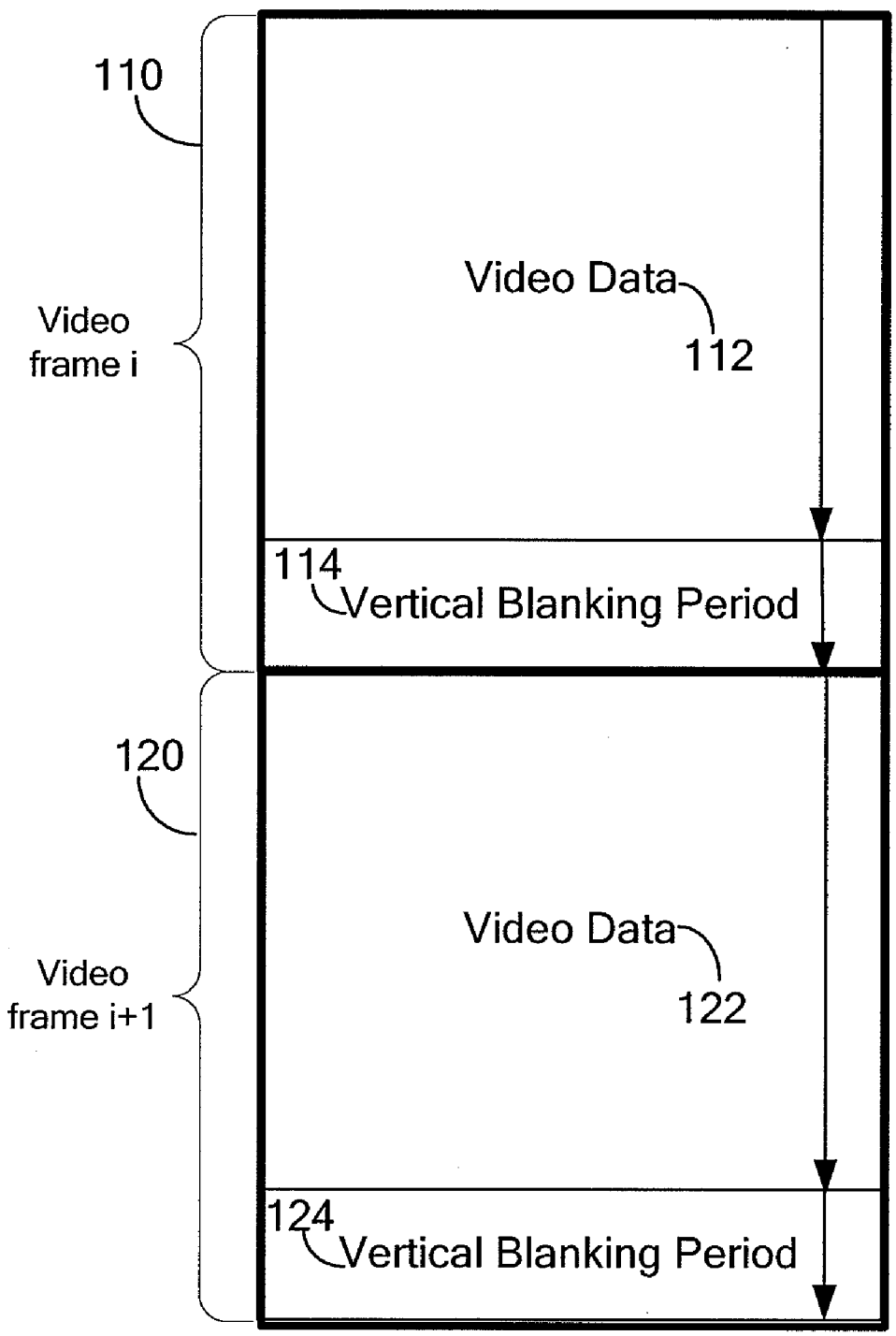
FIG. 1 is a schematic diagram of video frames in which each frame has a video data portion and a vertical blanking period portion (prior art)
Figure 2:
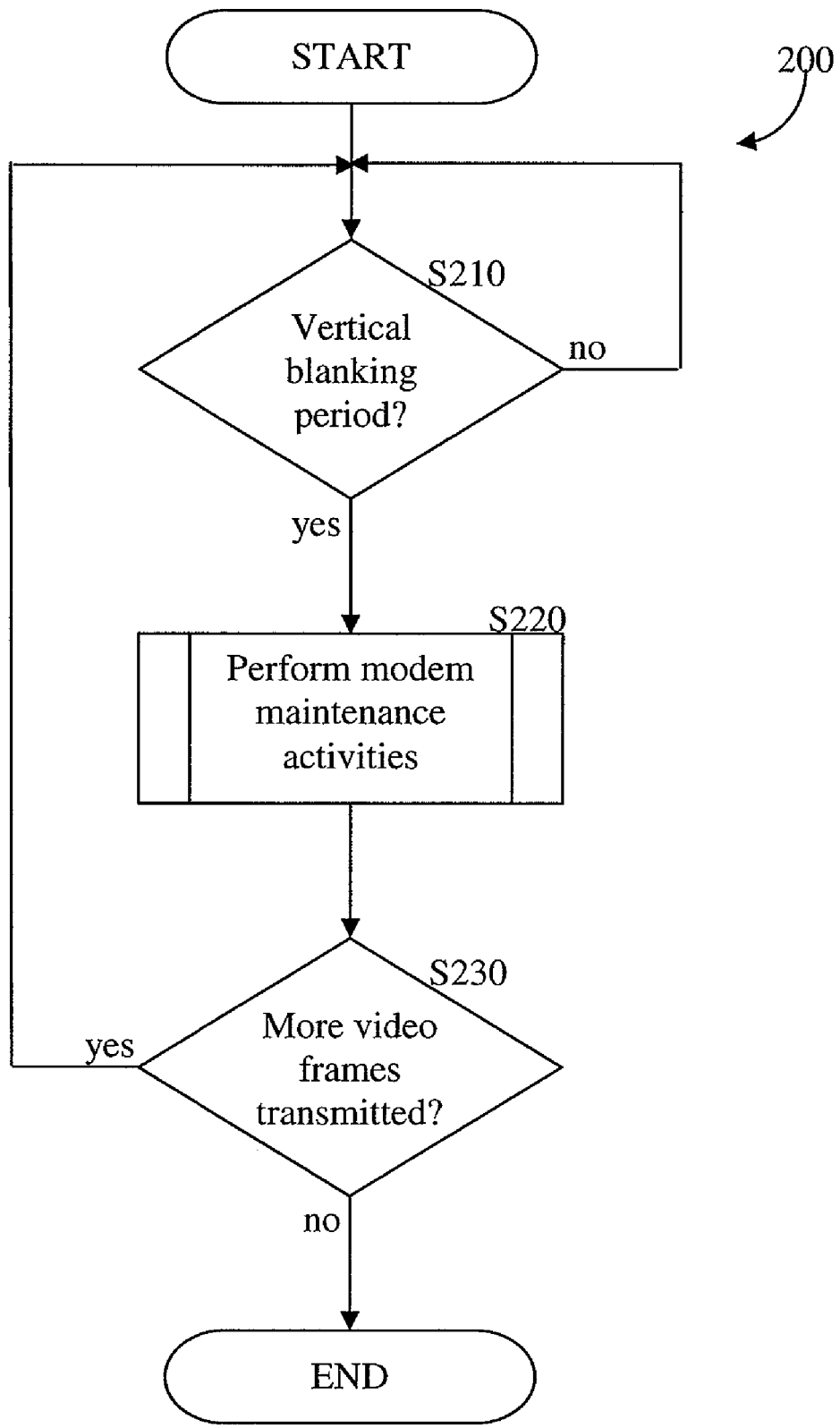
FIG. 2 is a flowchart showing maintenance of a wireless modem according to the invention.

FIG. 2 is a flowchart 200 that describes the maintenance of a wireless modem according to the invention. In step S210, a check is made to determine whether it is in a vertical blanking period of the video transmission and, if so, execution continues with step S220. Otherwise, execution returns to step S210, causing the procedure to wait until a vertical blanking period is detected. In step S220, wireless modem maintenance is performed, as explained in more detail below. It should be noted that it is not necessary that all the activities of maintenance are performed in a single vertical blanking period. According to the invention, one or more of the maintenance activities may take place in one vertical blanking period, while other activities may take place in another vertical blanking period. It is also possible that a specific modem maintenance activity may take place over a plurality of vertical blanking periods. A feedback (or uplink) channel communication between the receiver modem and the transmitter modem may also exist for use during the vertical blanking period, thus allowing for notification from the receiver modem to the transmitter modem of the conditions viewed by the receiver and for transfer of application data. In step S230, there is a check for whether the video signal is continuing and, if so, execution continues with step S210. Otherwise, execution is terminated.

An advantage of using the vertical blanking period in accordance with the disclosed invention is that modem maintenance can use both continuous and burst activities which are not available during normal video transmission, but which are required for proper modem operation. By using the vertical blanking period, rather than during normal video data transmission, the reduction of the video transmission bandwidth is avoided and, as noted above, there is no need for special buffering of the video signal if the video signal is expanded to fit an entire video frame. Performing modem maintenance activities during video signal transmission reserves the system's ability to perform burst activities of the maintenance operation because during video data transmission, the available bandwidth is fully used. A person skilled in the art would readily realize that performing such modem maintenance burst operations may result in a loss of a whole video frame when performed in the middle of video transmission. Therefore, the solution described herein overcomes significant deficiencies of the prior art, and is of particular importance in the case of high-definition video transmission. For example, the use of the vertical blanking period in accordance with the disclosed invention allows efficient modem synchronization and signal detection, because it is not necessary to handle any video transmission at the same time. In one embodiment of the invention, the internal channel equalization and internal state machines are reset in response to bad channel conditions. As a result, the channel characteristics are reevaluated from scratch and, possibly, a better operation point may be found.

As noted above with respect to step S220, there are multiple activities that may be performed for the purpose of the maintenance of the modem during the vertical blanking period. The following are examples of such modem maintenance activities. It is specifically noted that a person skilled in the art would readily add other such other maintenance activities and such activities are specifically included within the scope of the invention.

During the vertical blanking period it is possible to perform signal detection and synchronization activities. These activities use specific signals, such as periodically transmitting a preamble during each vertical blanking period. In some embodiments, for example as in the '641 application, the preamble requires that no other data is sent while the preamble is being transmitted, making the vertical blanking period an advantageous period of choice for such transmission. The lack of interfering signals during the continuous transmission of the preamble results in an effective detection and synchronization on the receiver side.

Another activity of modem maintenance is the automatic gain control (AGC) that allows for the fine tuning of the radio frequency (RF) circuitry. By doing this periodically, gain control is maintained without interference with the video data transmission. Similarly, the channel estimation may be done periodically. This activity does not have to happen every vertical blanking period and may be triggered by an external event, if necessary. However, this activity is done during the vertical blanking period to avoid problems during the video transmission period. In some cases, such channel estimation may optionally begin from scratch.

In another embodiment, the vertical blanking period allows using more burst signals, thus resulting in improved channel handling. As noted above, the vertical blanking period may also be used for the transmission of a feedback channel or upstream transmission, primarily for the receiver to control the transmitter, for example, for the purpose of power control. A receiver may request to increase or decrease of power transmission through such a feedback, which can be processed, acknowledged, and acted upon within the vertical blanking period. Such an activity could not be practically achieved during the transmission of video data without loss of data.

Other activities may include, but are not limited to, dynamic frequency selection (DFS), high-bandwidth digital content protection (HDCP) key resolution, and handling of extended display identification data (EDID). Moreover, during the vertical blanking period it is possible to identify other transmitters that are currently operating in the vicinity of the modem. This allows for better selection of a channel in the case where a channel hop is necessary e.g. when signal-to-noise ratio require such a hop to avoid channels that are used by the other transmitters. As noted above with respect to all of the modem maintenance activities, a key advantage of the invention is that loss of video frames is prevented by performing the modem maintenance activities during the vertical blanking period.

In another embodiment, the wireless modem may utilize the horizontal blanking period for sending control data, auxiliary data or video data. As the duration of the horizontal blanking period is very short the data to be transmitted during this period can be typically modulated into, for example, at most a single OFDM symbol.

Figure 3:
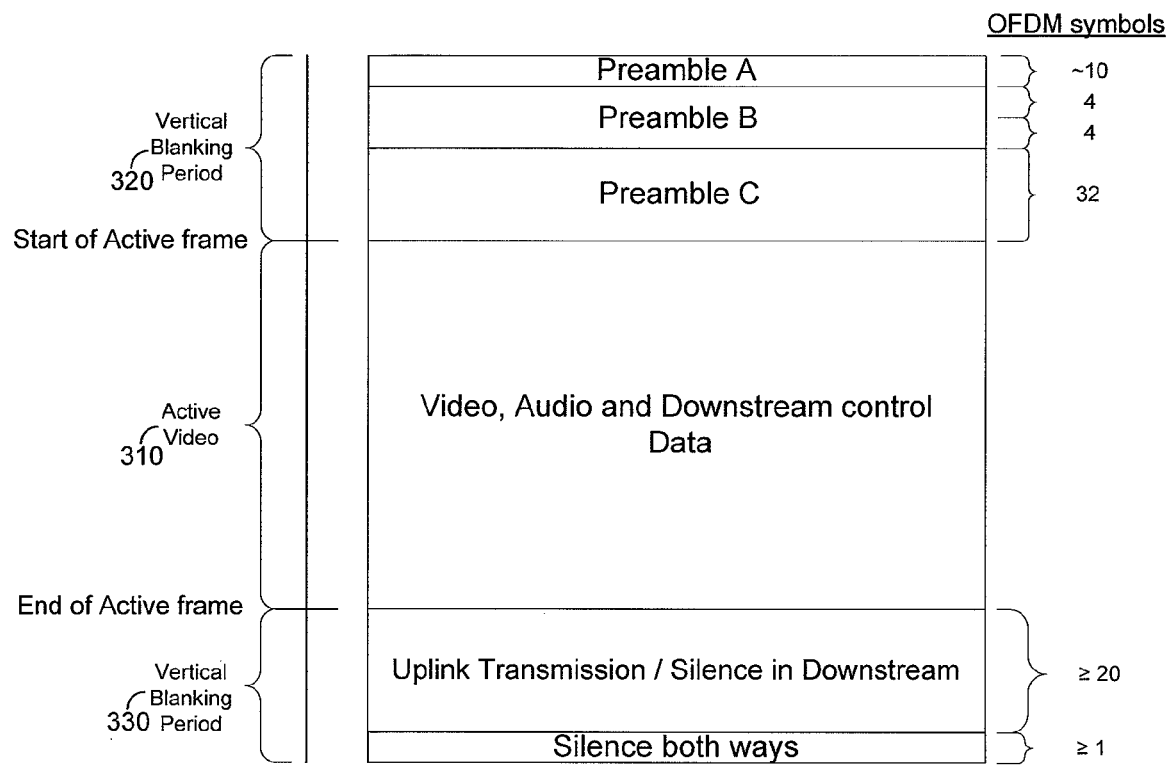
FIG. 3 is a schematic diagram showing a video frame according to the invention.

FIG. 3 is a schematic diagram of a video frame structure 300 in accordance with the invention. The video frame structure 300 includes a video data portion 310, a first vertical blanking period portion 320, and a second vertical blanking period 330. During the first vertical blanking period portion 320, three preambles are transmitted: Preamble-A, Preamble-B, and Preamble-C. Preamble-A is used for synchronization. Channel estimation for coarse data, frequency estimation tasks, and AGC are also performed by Preamble-A. In an exemplary embodiment the size of Preamble-A is ten OFDM symbols. Preamble-B is used for channel estimation of the fixed pilot bins and fine bins of the OFDM symbols. Furthermore, frequency tracking is performed by Preamble-B to achieve correct frequency estimation. In an exemplary embodiment the size of the Preamble-B is eight OFDM symbols. Thereafter, in the Preamble-C, all the coarse bins channel matrices are estimated and inverted before these bins can be used to transmit fine video data. At the same time, the transmission of coarse data is started, because the coarse bins channels have already been estimated. Therefore, a video frame header data is sent in the coarse bins while transmitting moving pilots in the fine bins. In an exemplary embodiment, the size of Preamble-C is 32 OFDM symbols.

The second vertical blanking period 330 begins immediately after the transmission of the video data portion 310 and is used for transmitting uplink data, i.e. data sent from a video display unit (VDU), to a video source unit (VSU). During this time no data are transmitted in the downlink direction, i.e. from a VDU to a VSU. In an exemplary embodiment the size of the uplink transmission is up to twenty OFDM symbols. Thereafter, no data is transmitted in both directions (silence period) to allow channel vacancy test.

It will be apparent to a person skilled in the art that by transmitting the preambles and in particular preambles A and B during the vertical blanking periods, the video modem can establish a new wireless channel each frame. This allows, for example, continuous transmission even during the presence of an interferer, as during the vertical blanking period the modem can switch to other frequency band and to re-synchronize with the receiver. In addition, synchronizing the modem each frame may be used for the generation of a frame synchronized clock for a wireless video receiver, as discussed in detail in U.S. patent application Ser. No. 11/470,582, assigned to common assignee and which is incorporated herein by this reference thereto.

It will be apparent to a person skilled in the art that data transmitted in the first and second vertical blanking portions 320 and 330 is not limited to what is shown in FIG. 3. Specifically, the first vertical blanking portion 320 can include the uplink data and one of the preambles, while the second vertical blanking portion 330 can include those preambles that have not been transmitted in the first portion 320 and the silence period. Furthermore, the video modem may use a portion of the blanking period to transmit video data, and thus to increase the video transmission bandwidth. For example, if the vertical blanking period is approximately 4% of the entire time period of frame, then a half of this period may be used for sending video data and the rest for performing the maintenance activities. This would require a buffer having a size of a portion of a frame.

Although the invention is described herein with reference to several embodiments, including the preferred embodiment, one skilled in the art will readily appreciate that other applications may be substituted for those set forth herein without departing from the spirit and scope of the invention. The invention may be further implemented in hardware, software, or any combination thereof. Accordingly, the invention should only be limited by the following claims. The invention is applicable, but not limited to, standard as well as high-definition television.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method of wireless video communication, the method comprising: transmitting from a video source to a video destination over a first wireless channel a wireless video transmission including video data, and during at least one vertical blanking period (VBP) between consecutive video frames of said video data, receiving at said video source wireless modem maintenance information from said video destination, wherein the wireless modem maintenance information received during a given VBP includes wireless channel estimation and synchronization information used to establish a second wireless channel between the video source and the video destination during the given VBP, such that a video frame transmitted after the given VBP is transmitted over the second wireless channel.

2. The method of claim 1 comprising: during one or more vertical blanking periods of said plurality of blanking periods, transmitting maintenance data from said video source to said video destination.

3. The method of claim 1, wherein said uplink transmission comprises a request to adjust a transmission power.

4. The method of claim 1, wherein said uplink transmission corresponds to transmission conditions viewed by said video destination.

5. The method of claim 1, wherein said video data comprises essentially uncompressed video data.

6. The method of claim 1, wherein said uplink transmission comprises twenty orthogonal-frequency-division-multiplexing symbols or less.

7. The method of claim 1, wherein said uplink transmission comprises extended display identification data.

8. The method of claim 2, wherein transmitting said maintenance data comprises transmitting a plurality of preambles.

9. The method of claim 2, wherein said maintenance data comprises data relating to one or more operations selected from the group consisting of signal detection, synchronization, automatic gain control, transmitter power control, dynamic frequency selection, high-bandwidth digital content protection key resolution, identification of channels used by other transmitters, and channel estimation.

10. The method of claim 2 comprising transmitting said maintenance data during two or more consecutive vertical blanking periods.

11. The method of claim 2 comprising: transmitting said wireless video transmission and said maintenance data via a first wireless channel of a first frequency band, wherein said maintenance data comprises data corresponding to a second wireless channel of a second frequency band; establishing said second wireless channel; and transmitting said wireless video transmission via said second wireless channel.

12. The method of claim 3 comprising adjusting a transmission power of the wireless video transmission from said video source to said video destination based on said request.

13. A method of wireless video communication, the method comprising: receiving at a video destination over a first wireless channel a wireless video transmission including video data from a video source; and during at least one vertical blanking period (VBP) between consecutive video frames of said video data, transmitting from said video destination to said video source wireless modem maintenance information, wherein the wireless modem maintenance information transmitted to the video source during a given VBP includes wireless channel estimation and synchronization information used to establish a second wireless channel between the video source and the video destination during the given VBP, such that a video frame transmitted after the given VBP is transmitted over the second wireless channel.

14. The method of claim 13 comprising: during one or more vertical blanking periods of said plurality of blanking periods, receiving at said video destination maintenance data from said video source.

15. The method of claim 13, wherein said uplink transmission comprises a request to adjust a transmission power.

16. The method of claim 13, wherein said uplink transmission corresponds to transmission conditions viewed by said video destination.

17. The method of claim 13, wherein said video data comprises essentially uncompressed video data.

18. The method of claim 13, wherein said uplink transmission comprises twenty orthogonal-frequency-division-multiplexing symbols or less.

19. The method of claim 13, wherein said uplink transmission comprises extended display identification data.

20. The method of claim 13, wherein said video destination comprises a video display.

21. The method of claim 14, wherein said maintenance data comprises a plurality of preambles.

22. The method of claim 14, wherein said maintenance data comprises data relating to one or more operations selected from the group consisting of signal detection, synchronization, automatic gain control, transmitter power control, dynamic frequency selection, high-bandwidth digital content protection key resolution, identification of channels used by other transmitters, and channel estimation.

23. The method of claim 14 comprising receiving said maintenance data during two or more consecutive vertical blanking periods.

24. The method of claim 14 comprising: receiving said wireless video transmission and said maintenance data via a first wireless channel of a, first frequency band, wherein said maintenance data comprises data corresponding to a second wireless channel of a second frequency band; establishing said second wireless channel; and receiving said wireless video transmission via said second wireless channel.

25. An apparatus comprising: a modem capable of transmitting a wireless video transmission including video data to a video destination; and receiving wireless modem maintenance information from said video destination during at least one vertical blanking period (VBP) between consecutive video frames of said video data, wherein the wireless modem maintenance information received during a given VBP includes wireless channel estimation and synchronization information used to establish a second wireless channel between the video source and the video destination during the given VBP, such that a video frame transmitted after the given VBP is transmitted over the second wireless channel.

26. The apparatus of claim 25, wherein said modem is capable of transmitting maintenance data to said video destination during at least one vertical blanking period of said plurality of blanking periods.

27. The apparatus of claim 25, wherein said uplink transmission comprises a request to adjust a transmission power of said modem, and wherein said modem is capable of adjusting a transmission power to said video destination based on said request.

28. The apparatus of claim 25, wherein said uplink transmission corresponds to transmission conditions' viewed by said video destination.

29. The apparatus of claim 25, wherein said video data comprises essentially uncompressed video data.

30. The apparatus of claim 25 comprising a video source unit.

31. The apparatus of claim 26, wherein said modem transmits said maintenance data by transmitting a plurality of preambles.

32. The apparatus of claim 26, wherein said maintenance data comprises data relating to one or more operations selected from the group consisting of signal detection, synchronization, automatic gain control, transmitter power control, dynamic frequency selection, high-bandwidth digital content protection key resolution, identification of channels used by other transmitters, and channel estimation.

33. The apparatus of claim 26, wherein said modem is capable of transmitting said maintenance data during two or more consecutive vertical blanking periods.

34. The apparatus of claim 26, wherein said modem is capable of transmitting said wireless video transmission and said maintenance data via a first wireless channel of a first frequency band, wherein said maintenance data comprises data corresponding to a second wireless channel of a second frequency band; establishing said second wireless channel; and transmitting said wireless video transmission via said second wireless channel.

35. An apparatus comprising: a modem capable of receiving over a first wireless channel a wireless video transmission including video data from a video source; and transmitting to said video source wireless modem maintenance information during at least one vertical blanking period (VBP) between consecutive video frames of said video data, wherein the wireless modem maintenance information received during a given VBP includes wireless channel estimation and synchronization information used to establish a second wireless channel between the video source and the video destination during the given VBP, such that a video frame transmitted after the given VBP is transmitted over the second wireless channel.

36. The apparatus of claim 35, wherein said modem is capable of receiving maintenance data from said video source during at least one vertical blanking period of said plurality of blanking periods.

37. The apparatus of claim 35, wherein said uplink transmission comprises a request to adjust a transmission power.

38. The apparatus of claim 35, wherein said uplink transmission corresponds to transmission conditions viewed by said modem.

39. The apparatus of claim 35, wherein said video data comprises essentially uncompressed video data.

40. The apparatus of claim 35, wherein said uplink transmission comprises twenty orthogonal-frequency-division-multiplexing symbols or less.

41. The apparatus of claim 35, wherein said uplink transmission comprises extended display identification data.

42. The apparatus of claim 35 comprising a video display.

43. The apparatus of claim 36, wherein said maintenance data comprises a plurality of preambles.

44. The apparatus of claim 36, wherein said maintenance data comprises data relating to one or more operations selected from the group consisting of signal detection, synchronization, automatic gain control, transmitter power control, dynamic frequency selection, high-bandwidth digital content protection key resolution, identification of channels used by other transmitters, and channel estimation.

45. The apparatus of claim 36, wherein said modem is capable of receiving said maintenance data during two or more consecutive vertical blanking periods.

46. The apparatus of claim 36, wherein said modem is capable of receiving said wireless video transmission and said maintenance data via a first wireless channel of a first frequency band, wherein said maintenance data comprises data corresponding to a second wireless channel of a second frequency band; establishing said second wireless channel; and receiving said wireless video transmission via said second wireless channel.

47. An apparatus comprising: a modem capable of wirelessly transmitting video data of a first video frame to a video destination via a first wireless channel of a first frequency band; establishing with said video destination a second wireless channel of a second frequency band during a vertical blanking period (VBP) between said first video frame and a second video frame; and wirelessly transmitting video data of said second video frame via said second wireless channel; wherein establishing a second wireless channel includes receiving wireless modem maintenance information from the video destination during the vertical blanking period, wherein the wireless modem maintenance information received during a given VBP includes wireless channel estimation and synchronization information used to establish the second wireless channel between the video source and the video destination during the given VBP.

48. The apparatus of claim 47, wherein said video data comprises essentially uncompressed video data.

49. The apparatus of claim 47 comprising a video source unit.

\* \* \* \* \*